(12) United States Patent
Wang

(10) Patent No.: US 6,645,265 B1
(45) Date of Patent: Nov. 11, 2003

(54) POLISHING FORMULATIONS FOR SIO$_2$-BASED SUBSTRATES

(75) Inventor: Yuhu Wang, Littleton, MA (US)

(73) Assignee: Saint-Gobain Ceramics and Plastics, Inc., Worcester, MA (US)

( * ) Notice: Subject to any disclaimer, the term of this patent is extended or adjusted under 35 U.S.C. 154(b) by 0 days.

(21) Appl. No.: 10/199,593

(22) Filed: Jul. 19, 2002

(51) Int. Cl.$^7$ ................................................. C09K 3/14
(52) U.S. Cl. .......................... 51/308; 51/307; 51/309; 106/3; 423/263; 427/212; 427/213.32; 427/215
(58) Field of Search .......................... 51/307, 308, 309; 106/3; 423/263; 427/212, 213.32, 215, 218

(56) References Cited

U.S. PATENT DOCUMENTS

| | | | | |
|---|---|---|---|---|
| 5,697,992 A | * | 12/1997 | Ueda et al. | 51/307 |
| 5,804,513 A | * | 9/1998 | Sakatani et al. | 438/693 |
| 2002/0003225 A1 | * | 1/2002 | Hampden-Smith et al. | 252/79.1 |
| 2002/0177311 A1 | * | 11/2002 | Schumacher et al. | 438/689 |

* cited by examiner

*Primary Examiner*—Michael Marcheschi
(74) *Attorney, Agent, or Firm*—Joseph P. Sullivan

(57) ABSTRACT

Powders of particles comprising a ceramic core and a coating of ceria deposited thereon provide an economical and effective abrasive for glass polishing formulations.

9 Claims, No Drawings

POLISHING FORMULATIONS FOR SIO₂-BASED SUBSTRATES

BACKGROUND OF THE INVENTION

This invention relates to materials used to polish $SiO_2$-based substrates and specifically to abrasive particles used in such materials.

The most widely used abrasive for polishing SiO2 based materials, such as glass or quartz surfaces is ceria and this is because it gives the highest polishing rate combined with the best surface finish among all the alternative abrasives materials that have been tried such as silica, iron oxide, zirconia and various forms of alumina. However it is also very expensive when supplied as a pure material. To mitigate this factor, ceria has been used in admixture with other abrasives such as oxides of silicon, aluminum, rare earth metals or calcium. This saves money but carries a penalty since, in general terms and in the context of glass polishing, the higher the impurity level, the longer it takes to remove the required amount of surface and the worse the surface finish. In part this is because ceria operates on glass in a chemical-mechanical polishing manner which is not available with the other abrasive oxides. Ceria, with its properties largely dependent upon its defect structure, especially shows affinity to $SiO_2$ which is the basis for the chemical-mechanical polishing effect. It is also softer than $SiO_2$ or $SiO_2$-based glass, which prevent the surface from rough scratches. Thus commercial ceria polishing compositions may contain only 40 to 80% of ceria but the use of such materials is confined to polishing conventional glasses used for mirrors, TV screen surfaces, ordinary optical lenses and so on where the highest finish standards are not so critical. With the maximum chemical-mechanical effect, pure ceria is however still used for the most critical high precision surfaces.

There is therefore a need to supply high quality ceria polishing compositions at a more affordable price that are still adapted for use in producing very high precision polished glass surfaces.

GENERAL DESCRIPTION OF THE INVENTION

The present invention provides abrasive particles which comprise a ceramic core with a coating of ceria deposited thereon such that the ceria represents for 2 to 30%, and preferably from 3 to 15% of the weight of the particles. In such a core-shell structure, the inert core will provide mechanical action while the shell give chemical action during the polishing.

The ceramic core can be any ceramic oxide but is preferably one on which ceria can readily precipitate and adhere as a thin layer. The interface between the core and shell ceria should be strong enough to ensure that the shell will not easily come off during processing and abrasion action in the course of polishing a substrate. Preferably, not only physical attachment on the cores but strong chemical bonding exists between the CeO2 coating and cores.

The particle sizes are preferably those most useful in putting a polished surface on glass. Most preferably the particles do not contain a large volume of particles that are significantly larger than the average. Therefore with the particle sizes herein being the volume average particle size as measured by a Microtrac technique, the $d_{90}$ particle size should not be more than an order of magnitude larger than the $d_{50}$ particle size.

The actual size of the coated particles is determined by the application intended and the practicalities of the process. Large sized particles give higher material removal rate but normally worse surface finishing than the small sized particles. Since a major objective is to reduce the cost of the polishing operation, the use of very fine ceramic core particles will lead to a high surface area and therefore a large amount of ceria will be required to place a coat thereon. In addition the coating process becomes more difficult to carry out. As a practical matter therefore the coated particles are commonly built on 20 to 2000 nanometer core particles and the shell deposited thereon has a thickness, estimate from the increase in weight of the particles, of from 1 to 20 and preferably from 2 to 10 nanometers.

The invention further provides a polishing formulation comprising an abrasive powder as described above dispersed in a carrier medium. The formulation can optionally also contain an adjuvant which aids in the dispersion of debris resulting from the polishing action such that it can be removed from the surface in suspension in the dispersion medium.

The invention further provides a method making abrasive particles comprising a ceramic shell with a surface layer of ceria which comprises dispersing a ceramic powder in a dispersion medium such as water which contains in solution a ceria precursor and treating the dispersion to separate a powder comprising ceramic powder particles having a surface layer of ceria deposited thereon.

DESCRIPTION OF PREFERRED EMBODIMENTS

The preferred substrate ceramic materials are silica, silicon carbide and alumina. The silica option is more preferably fumed silica since this is readily available in the form of a very fine powder with relatively uniform particle sizes. It is also quite insoluble in water which is the preferred dispersion medium for the production of polishing slurries providing the pH is not excessively acidic or basic. The silica option can also be fused silica powder, which has larger size (~1–2 um) or colloidal silica, which has smaller size (10 nm~100 nm) as compared with fumed silica. The alumina option can be particles of alpha alumina, gamma alumina, amorphous alumina or boehmite. Silicon Carbide can be in either the alpha or beta crystalline phase, but with the surface oxidized so that ceria can be more adherent than on SiC itself. References to "silicon carbide" in the following should be understood to refer to such surface-oxidized materials.

A polishing slurry containing the novel powder according to the invention is preferably water-based and may contain water-soluble detergent materials such as phosphates, as long as no inhibiting effect upon the contact of ceria to the substrate surface. The pH of the polishing formulation can be kept from 3 to 11. Normally, higher pH leads to higher hydration rate or dissolution rate of $SiO_2$ which benefit the polishing action. However, low pH might be preferred in some cases where good stability of the slurry is required, as ceria can be better dispersed in acidic solution and the slurry will have longer shelf time. In either the cases, the isoelectric point (IEP) of ceria, normally around pH 7, should be avoided.

The production of the ceria-coated particles is preferably accomplished by a solution process. First, ceramic particles need to be mixed with water to make a good and stable dispersion. To the solution, water soluble cerium salts can be added before or after the pH is raised to close to 10 at which point, cerium salts will completely precipitate as oxide or hydroxide. If addition occurs before the pH is raised, a mixture of cerium salt with ceramic particles in water will typically have an acid pH value and this can be adjusted by addition of a base that is effective to raise the pH, typically to about 10. At this pH the cerium salt deposits on the ceramic particles, probably in the form of the hydrated oxide. A straightforward way is to add $NH_4OH$ to the solution containing the cerium salts under vigorous stirring until a pH of 10 is reached. Alternatively a basic chemical such as urea can be dissolved in the solution, followed by decomposition of urea into ammonia by heating the solution to an elevated temperature, preferably from about 75 to 90° C. and holding the solution at the temperature until ceria deposition is complete. In that way, pH is raised in-situ, and there is no abrupt local increase of pH in a local region as would occur when ammonia is added. Cerium salts can also be added after the pH is raised. For example an aqueous dispersion of ceramic particles, such as $SiO_2$, can be first mixed with ammonia to a high pH of about 10, and an aqueous solution of a cerium salt can then be added dropwise to the solution while under stirring. As the salt solution is added the pH falls so a certain amount of aqueous ammonia needs to be added to keep the solution around pH 10. Thereafter the particles can be separated by sedimentation or by the use of a centrifuge and fired at from 600 to 1000° C. to form the ceria as a thin shell on the surfaces of the ceramic particles. This shell can represent any desired percentage of the weight of the powder, such as from 3 to 25% and most preferably from 3 to 15% of the weight of the particles.

The precursors for the ceria can be any cerium salts that are water soluble, such as $Ce(NO_3)_3.6H_2O$, $Ce(SO_4)_2.4H_2O$, $(NH_4)_2.Ce(NO_3)_6$ and the like. It is also possible to use a commercial $CeO_2$ sol, (for example Nyacol).

Production of Core-Shell Structured Particles

A convenient way of producing the core-shell ceramic particles of the invention is exemplified by the following Examples.

EXAMPLE 1

A fumed silica powder with a surface area of 15 $m^2/g$, 300 g, which corresponds to an average particle size of about 300 nanometers, was dispersed in 2700 g of water. After 30 min. of sonication, 150 g of cerium nitrate hexahydrate is added which gives a solution at pH 2.7. The pH of the dispersion was adjusted using 500 g of urea and the mixture was aged at about 90° C. for a period of 16 hours. During this time the pH changed from about 3.64 to 8.3. After the pH had stabilized at this level, the solid material was separated by centrifuge and dried in an oven for overnight before being fired at 800° C. over a period of about 2 hours. The fumed silica powder showed a weight increase of 15% due to the formation of a ceria shell around the particles. After firing, this material is crushed and pulverized into powder to make a polishing slurry.

A number of glass polishing slurries were produced with a pH of 10 and a 5 wt % solids content of the abrasive. The slurries differed only in the abrasive used as follows:

PA-1 100% pure ceria. This is made from the same cerium nitrate salt via the same precipitation and firing process, except there was no silica powder used as cores.
PA-2 "Opaline" which is a commercial ceria polishing powder containing about 100% of ceria obtained from Rhodia under that registered trademark.
PA-3 100% fumed silica having a purity of about 96% and an average particle size, ($d_{50}$), of about 0.4 micrometers.
INV-1 This illustrates the invention and was prepared using the above process based on the fumed silica in PA-3.

The above formulations were evaluated under identical conditions in the polishing of a fused $SiO_2$ glass surface using a 5% slurry at pH=10. In each case the time taken to reach the final $R_a$ level and the $R_a$ after such period were both measured, along with the amount of glass removed from the surface in that time. The results are shown in Table 1 below.

TABLE 1

|  | Density ($g/cm^3$) | Time (min) to Final $R_a$ | Glass Removal Rate ($\mu m/min$) | Final Surface Finish $R_a$ (A) |
| --- | --- | --- | --- | --- |
| PA-1 | 7.13 | 10 | 1.1 | 9 |
| PA-2 | 7.13 | 10 | 1.94 | 9.2 |
| PA-3 | 2.3 | 30 | 0.15 | 59.9 |
| INV-1 | 2.6 | 10 | 0.87 | 7.4 |

From the above data it is very clear that the present invention provides a glass polishing formulation that removes material at a rate that is a little less than that achieved with the most pure ceria powders available, in about the same time and with a better surface finish. In all respects it performs better that the silica core powder at only a slightly elevated cost.

EXAMPLE 2

The fumed silica used in Example 1, (200 g) was mixed with 1800 g of DI water. 2.12 g of ammonia was added to adjust the pH to 10 under vigorous stirring. In a separate beaker, 100 g of $Ce(NO_3)_3.6H_2O$ was dissolved in 100 g of DI water. Under the vigorous stirring, the cerium nitrate solution is added drop wise to the fumed silica slurry slowly. At the same time, aqueous ammonia (~30%) is added to the slurry to keep the solution at pH~10 and thus ensure that all cerium salt hydrolyzes completely. In total, 86.8 g of ammonia was added together with the cerium nitrate solution. After finishing addition of the cerium nitrate solution, solid material is separated from solution by centrifuge and dried in oven for overnight. Thereafter, the material is fired at 800° C./2 hrs, followed by crushing into fine powder before being mixed with water to make a polishing slurry.

EXAMPLE 3

The above procedures in Example 2 were used to generate the core-shell structure on fused silica powder which is commercially available from Alfa Aesar, with 2 um average particle size; S.A., $2m^2/g$; and 99.5% purity. The fused silica was first dispersed in water, with pH adjusted with ammonia. The slurry was poured through a metal screen #325 to remove any large particles, before the same treatment the same way as in Example 2. The product was pulverized into powder for polishing test.

EXAMPLE 4

80 g of the same fumed silica as in Example 1 was well dispersed in 4000 g DI water under stirring, to which, 7.6 g of $Ce(SO_4)_2.xH_2O.yH_2SO_4$, 9.12 g of $(NH_4)_2.Ce(NO_3)_6$, and 64.4 g of $H_2SO_4$ were added. The solution was heated to 95° C. and aged at that temperature for 16 hours. In addition 250 g of urea were added to the solution which was then aged for 6 more hours. Thereafter, the solids were separated from the solution by centrifuge, dried in oven and then fired at 800° C./2 hrs. After calcinations, the material was pulverized into powder and provided for polishing test on $SiO_2$ in the form of an aqueous dispersion with a pH 10 containing 5% solids. Table 2 summarizes the polishing results as compared with pure ceria either commercial product or according to the invention.

TABLE 2

|       | Density (g/cm³) | Time (min) to Final $R_a$ | Glass Removal Rate (μm/min) | Final Surface Finish $R_a$ (A) |
|-------|-----------------|---------------------------|------------------------------|-------------------------------|
| PA-1  | 7.13            | 10                        | 1.1                          | 9                             |
| PA-2  | 7.13            | 10                        | 1.94                         | 9.2                           |
| PA-4  | 2.2             | 30                        | 0.45                         | 122                           |
| INV-2 | 2.6             | 10                        | 0.87                         | 7.4                           |
| INV-3 | 2.6             | 10                        | 1.40                         | 30.1                          |
| INV-4 | 2.4             | 10                        | 0.78                         | 8.6                           |

PA-4 Fused silica powder obtained from alfa Aesar that was used as cores in Example 3.
INV-2 Powder produced in Example 2
INV-3 Powder produced in Example 3
INV-4 Powder produced in Example 4

From Table 2, it is clear, that cerium precursors other than cerium nitrate can also be used to process different type of core particles to achieve improved polishing performance. It is also noticeable that the larger silica core particles, while showing an impressive material removal rate, led to a rougher finish on account of the larger average particle size.

I claim:

1. A process for the production of a glass polishing abrasive powder comprising ceramic core particles and a shell of ceria deposited thereon which comprises mixing a powder of the ceramic core particles with a solution of a ceria precursor to form a dispersion having solid content; adjusting the dispersion to have a pH of at least 8; aging the dispersion at a temperature of from 60 to 95° C. until the pH has stabilized above 8; separating and drying the solids content of the dispersion; and firing the dried solids at a temperature of from 600 to 1000° C., wherein the core particles are different material from the shell.

2. The process of claim 1, in which the ceria represents from 2 to 40% of the particle weight.

3. The process of claim 1, in which the ceria represents from 3 to 20% of the particle weight.

4. The process of claim 1, which the ceramic providing the core particles is selected from the group consisting of silica, alumina, zirconia, silicon carbide, calcium oxide, rare earth metal oxides and mixtures thereof.

5. The process of claim 1, in which the ceramic providing the particles is selected from filmed silica and colloidal silica.

6. The process of claim 1, which the ceria precursor is selected from $Ce(NO_3)_3 \cdot 6H_2O$, $Ce(SO_4)_2 \cdot 4H_2O$, $(NH_4)_2 \cdot Ce(NO_3)_6$ and $CeO_2$ sols.

7. The process of claim 1, in which the pH is adjusted to about 10.

8. The process of claim 1, in which the pH adjustment step comprises adding a base to the dispersion.

9. The process of claim 8, in which the base is ammonium hydroxide, urea or a combination thereof.

* * * * *